US006254108B1

(12) United States Patent
Germain et al.

(10) Patent No.: US 6,254,108 B1
(45) Date of Patent: Jul. 3, 2001

(54) ROLL CONTROL SYSTEM FOR A MOTOR VEHICLE

(75) Inventors: Philippe Germain, Montreuil; Robin Oakley, Trumilly, both of (FR)

(73) Assignee: Delphia Technologies, Inc., Troy, MI (US)

( * ) Notice: Subject to any disclaimer, the term of this patent is extended or adjusted under 35 U.S.C. 154(b) by 0 days.

(21) Appl. No.: 09/488,199

(22) Filed: Jan. 19, 2000

(51) Int. Cl.$^7$ .................. B60G 21/045; B60G 21/067
(52) U.S. Cl. ........................... 280/5.506; 280/5.505; 280/124.106
(58) Field of Search ............... 280/5.505, 5.506, 280/124.106

(56) References Cited

U.S. PATENT DOCUMENTS

| | | | |
|---|---|---|---|
| 3,417,985 | * 12/1968 | Hannan | 280/5.506 |
| 4,930,807 | * 6/1990 | Lachaize | 280/5.505 |
| 5,040,823 | * 8/1991 | Lund | 280/5.506 |
| 5,231,583 | * 7/1993 | Lizell | 280/5.506 |
| 5,505,480 | 4/1996 | Pascarella . | |
| 5,547,211 | * 8/1996 | Runkel | 280/5.506 |
| 5,788,031 | 8/1998 | Saito . | |

FOREIGN PATENT DOCUMENTS

| | | |
|---|---|---|
| 2006131 | 5/1979 | (GB) . |
| 2261489 | 6/1991 | (GB) . |
| 2323423 | 8/1998 | (GB) . |

* cited by examiner

*Primary Examiner*—Kenneth R. Rice
(74) *Attorney, Agent, or Firm*—Robert M. Sigler

(57) ABSTRACT

A roll control system (20) for installation between axially aligned wheels of a motor vehicle, the roll control system comprising a torsion bar (22); a first hydraulic actuator (24) attached to one end (28) of the torsion bar and attachable to one of the wheels; a second hydraulic actuator (24) attached to the other end (28) of the torsion bar and attachable to the other wheel; and an electronic control unit (26) monitoring one or more predetermined vehicle operating conditions; wherein the first and second hydraulic actuators are substantially identical, each comprising a compression chamber (30) containing hydraulic fluid, a rebound chamber (32) containing hydraulic fluid, a movable piston (34) between and fluidly isolating the compression chamber and the rebound chamber, a piston rod (58) connected to the piston and extending through the rebound chamber, a gas chamber (38) containing pressurised gas acting on the hydraulic fluid in the compression chamber, a compressible spring means (80) biasing the piston towards the compression chamber, and an electrically operated valve (36) between the compression chamber and the rebound chamber and actuated by the control unit dependent on the monitored conditions, the valve being actuable between a two-way position in which the valve allows hydraulic fluid to flow between the compression chamber and the rebound chamber and a one-way position in which the valve allows hydraulic fluid to flow from the compression chamber into the rebound chamber but not from the rebound chamber into the compression chamber. Reduces the risk of incorrect latching of the torsion bar.

19 Claims, 3 Drawing Sheets

ROLL CONTROL SYSTEM FOR A MOTOR VEHICLE

TECHNICAL FIELD

The present invention relates to a roll control system for a motor vehicle, and in particular to a semi-active roll control system.

BACKGROUND OF THE INVENTION

In order to prevent excessive rolling (which has an impact on vehicle attitude and handling) of a motor vehicle, especially during cornering, it is known to provide a torsion bar between the front wheels of a motor vehicle, and, in some cases, a second torsion bar between the rear wheels. However, during straight line motion of a vehicle and when the vehicle is off-road, the torsion bar can have a detrimental effect on comfort and wheel articulation. Semi-active roll control systems have been proposed which monitor various vehicle conditions. Such roll control systems include a locking device associated with the torsion bar and the wheels. When the sensed vehicle conditions indicate roll control is not required, the locking device is unlatched to effectively disconnect the effect of the torsion bar between the wheels. When the sensed vehicle conditions indicate that roll control is required, the locking device is latched to connect the wheels by way of the torsion bar. The latch position of the locking device determines the overall effect of the torsion bar on the wheels, and hence determines the level of roll control on the vehicle. In certain circumstances, it is possible to latch the torsion bar in the wrong position.

SUMMARY OF THE INVENTION

The object of the present invention is to lessen the risk and problems of potential incorrect latching.

A roll control system in accordance with the present invention for installation between axially aligned wheels of a motor vehicle comprises a torsion bar; a first hydraulic actuator attached to one end of the torsion bar and attachable to one of the wheels; a second hydraulic actuator attached to the other end of the torsion bar and attachable to the other wheel; and an electronic control unit monitoring one or more predetermined vehicle operating conditions; wherein the first and second hydraulic actuators are substantially identical, each comprising a compression chamber containing hydraulic fluid, a rebound chamber containing hydraulic fluid, a movable piston between and fluidly isolating the compression chamber and the rebound chamber, a piston rod connected to the piston and extending through the rebound chamber, a gas chamber containing pressurised gas acting on the hydraulic fluid in the compression chamber, a compressible spring means biasing the piston towards the compression chamber, and an electrically operated valve between the compression chamber and the rebound chamber and actuated by the control unit dependent on the monitored conditions, the valve being actuable between a two-way position in which the valve allows hydraulic fluid to flow between the compression chamber and the rebound chamber and a one-way position in which the valve allows hydraulic fluid to flow from the compression chamber into the rebound chamber but not from the rebound chamber into the compression chamber.

In the present invention, the net force within each hydraulic actuator is such as to tend to move the piston in each hydraulic actuator to a full compression position in which the volume of the associated compression chamber is at a minimum. If the control unit actuates the valve of one of the hydraulic actuators for roll control, when the associated piston is not in the full compression position, the net force will gradually move the piston towards full compression. As a consequence, the roll control system of the present invention reduces the problem of latching the torsion bar in an incorrect position.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
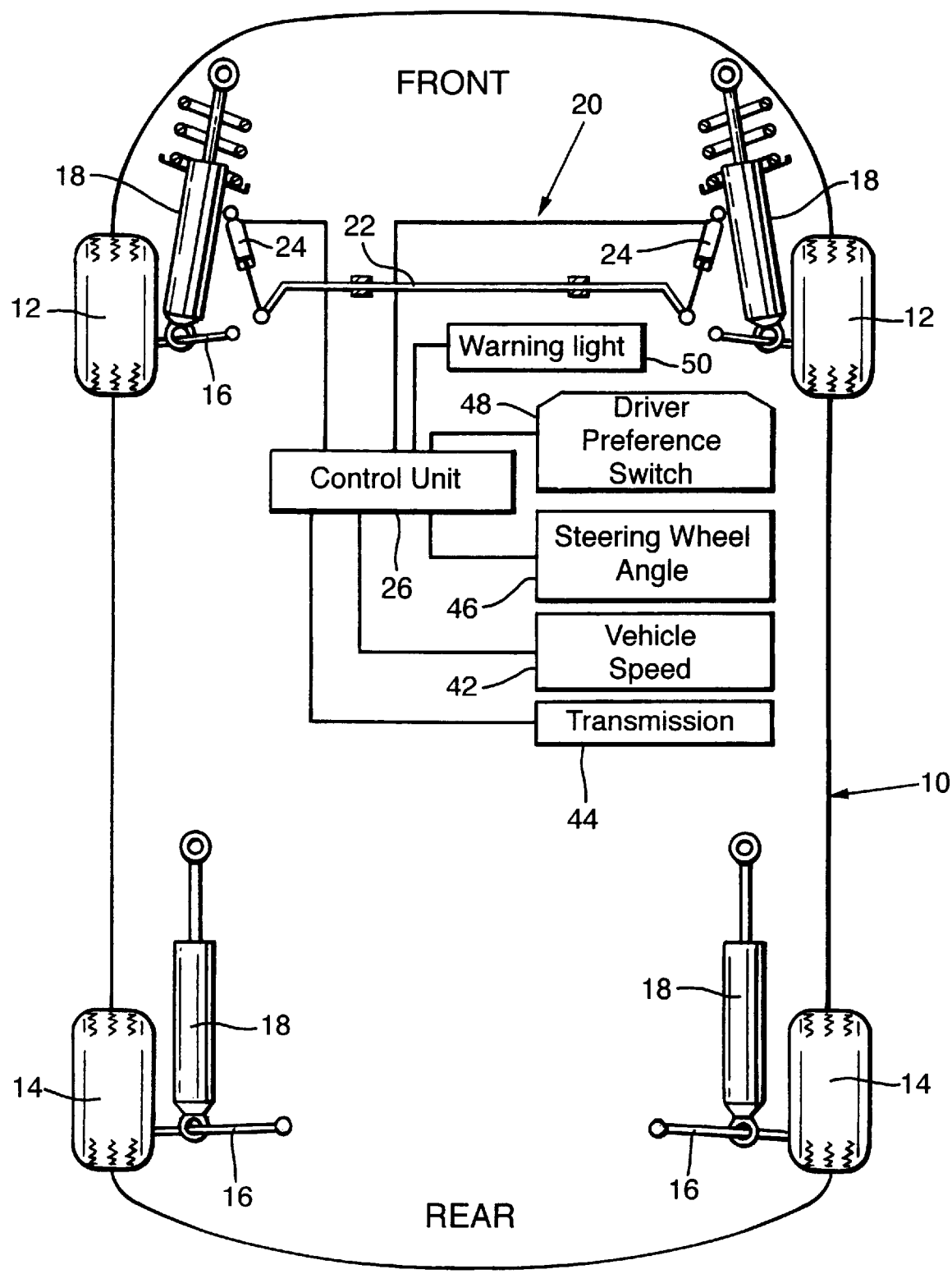
FIG. 1 is a schematic view of a motor vehicle having a roll control system in accordance with the present invention.

FIG. 1 shows an outline of a motor vehicle 10 having a pair of front wheels 12 and a pair of rear wheels 14. Each wheel 12,14 is rotatably mounted on an axle 16 and attached to the body of the motor vehicle 10 by way of a suspension unit 18. A roll control system 20 in accordance with the present invention is connected between the front wheels 12. A substantially identical roll control system may be connected between the rear wheels 14, if desired.

Figure 2:
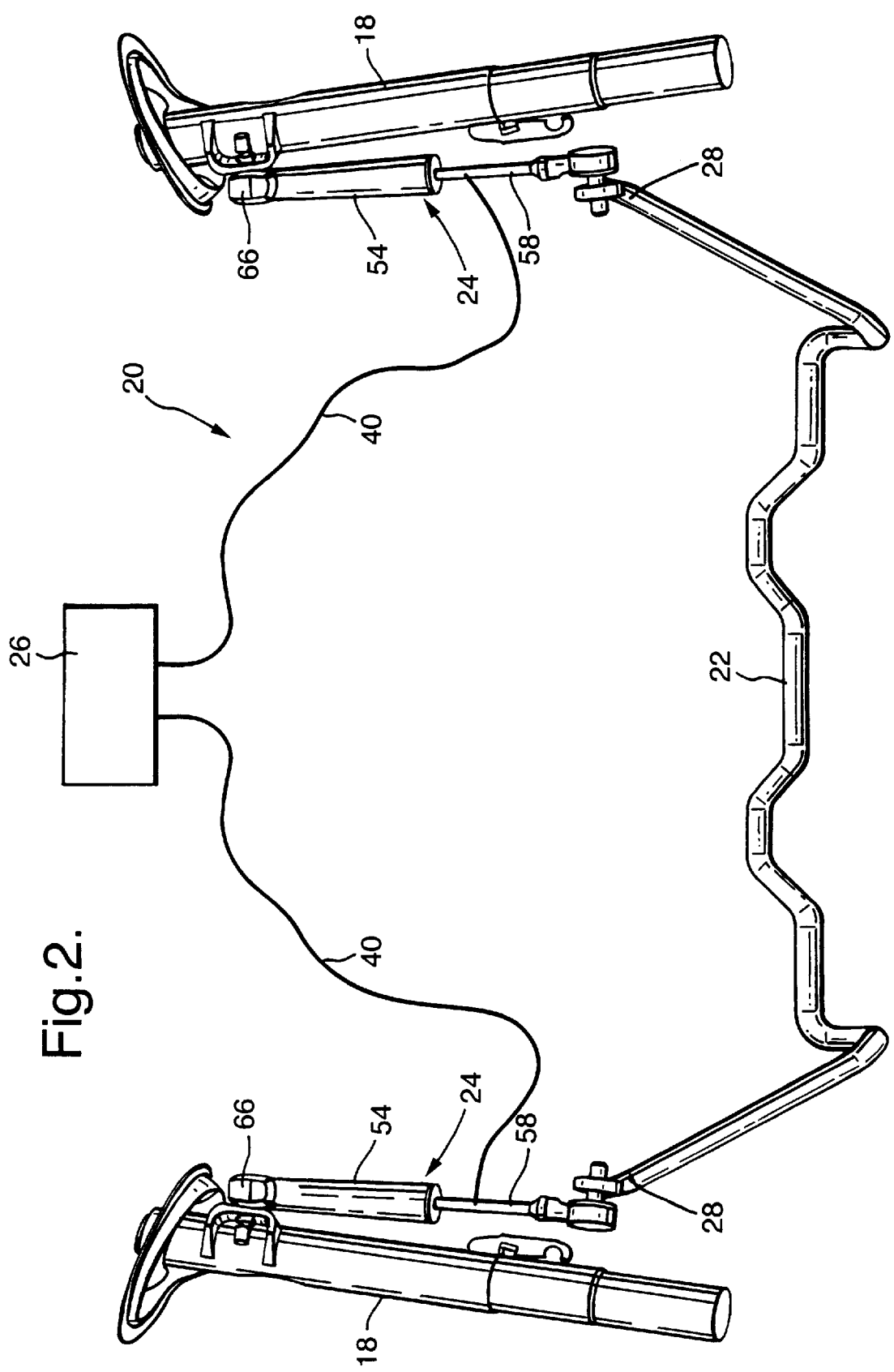
FIG. 2 is a perspective view of the roll control system of FIG. 1.
Figure 3:
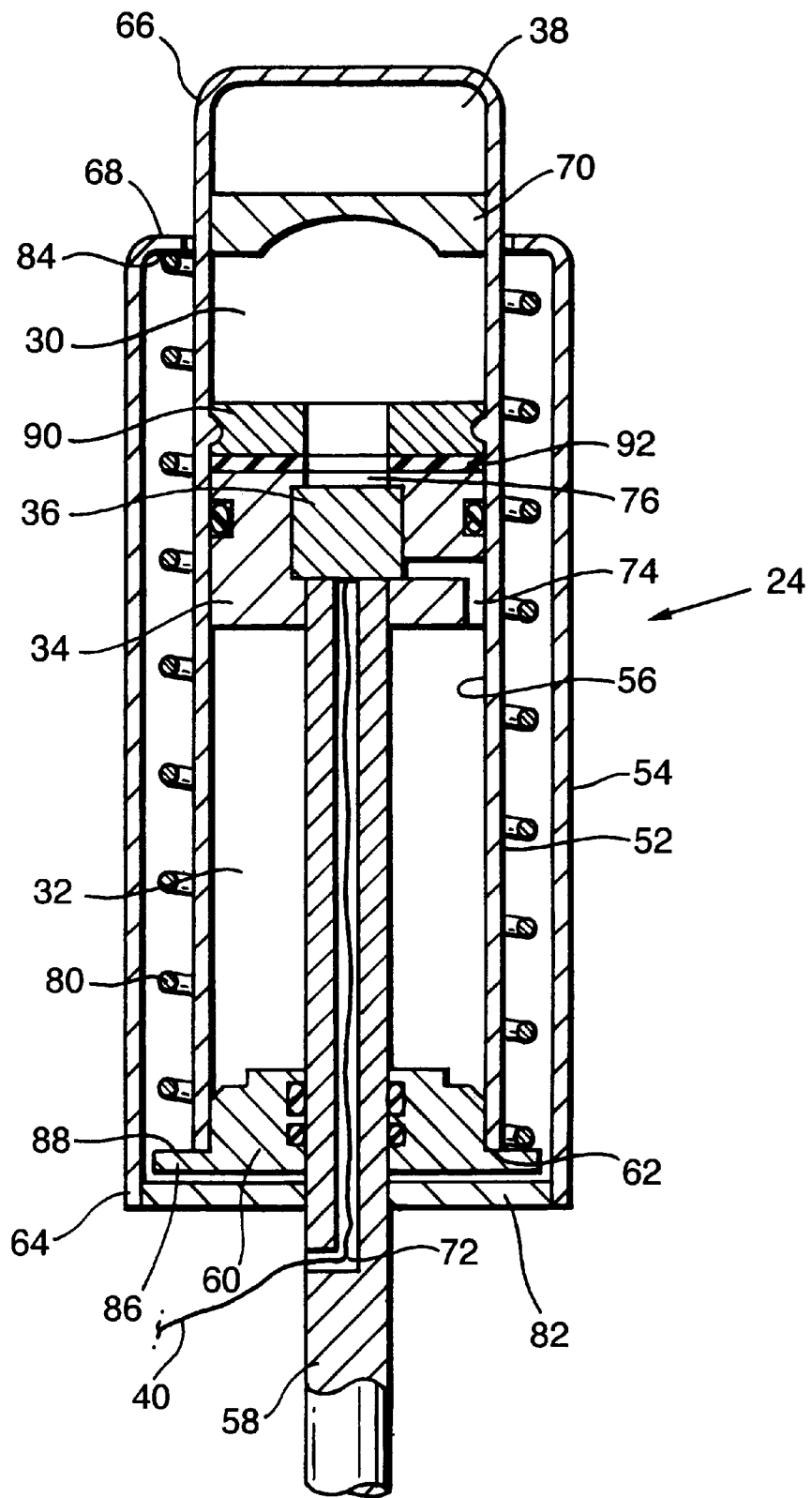
FIG. 3 is a cross-sectional view of one of the hydraulic actuators of the roll control system of FIG. 2.

Referring to FIG. 2, the roll control system 20 comprises a torsion bar 22, first and second hydraulic actuators 24, and an electronic control unit 26. The hydraulic actuators 24 are substantially identical. Each hydraulic actuator 24 is mounted between an end 28 of the torsion bar 22 and one of the suspension units 18. In general terms, and as shown in FIG. 3, each hydraulic actuator 24 comprises a compression chamber 30 containing hydraulic fluid, a rebound chamber 32 containing hydraulic fluid, a movable piston 34 between (and fluidly isolating) the compression chamber and the rebound chamber, a piston rod 58 connected to the piston and extending through the rebound chamber, an electrically actuated valve 36 between (and fluidly connecting) the compression chamber and the rebound chamber, a compressible spring 80 biasing the piston towards the compression chamber, and a compressible gas chamber 38 associated with the compression chamber.

The position of each piston 34 is dependent on the position of the associated end 28 of the torsion bar 22 relative to the associated suspension unit 18. When the hydraulic actuator 24 is substantially in full compression, the volume of the compression chamber 30 is at a predetermined minimum. The desired position of each hydraulic actuator 24 during roll control is full compression, when there is substantially no torque in the torsion bar 22.

The valve 36 is movable between a one-way position allowing fluid flow from the compression chamber 30 into, but not out of, the rebound chamber 32; and a two-way position allowing fluid flow in either direction between the compression chamber 30 and the rebound chamber 32. The valve 36 is preferably biased to the one-way position and is electrically connected to the control unit 26 by electrical leads 40.

The compressible gas chamber 38 contains a pressurised gas which acts on the hydraulic fluid in the compression chamber 30. Due to the static pressure exerted by the pressurised gas in chamber 38, there is a force exerted within the hydraulic actuator 24, which is proportional to the cross-sectional area of the piston rod 58 within the rebound chamber. The net force of the pressurised gas and the spring 80 is such as to bias each hydraulic actuator 24 towards full compression.

The control unit 26 is preferably a microprocessor which receives signals from one or more sensors (such as a vehicle speed sensor 42, a transmission speed sensor 44, a steering wheel angle sensor 46, and/or a driver preference switch 48) monitoring certain vehicle conditions and/or driver preference. The control unit 26 controls the movement of the valve 36 between the one-way position and the two-way position dependent on the signals received from the sensors, and may also actuate an alarm, such as a warning light 50, inside the vehicle 10 during certain monitored conditions.

When the control unit 26 determines that no roll control is required (typically during straight line motion of the vehicle 10 when off-road), the valves 36 are actuated to their two-way position such that hydraulic fluid can freely flow between the compression chambers 30 and the rebound chambers 32 in each hydraulic actuator 24. The pistons 34 are therefore free to float within each hydraulic actuator 24, and the torsion bar 22 is substantially disconnected from the front wheels 12.

When the control unit 26 determines that roll control is required, the valves 36 are moved to their one-way position to substantially prevent fluid flow from the rebound chamber 32 to the compression chamber 30 in each hydraulic actuator 24. The pistons 34 in each hydraulic actuator 24 are therefore effectively latched to prevent extension of the hydraulic actuators 24 due to the conditions sensed by the control unit 26. In this situation, the position of the torsion bar 22 relative to the front wheels 12 is effectively locked to provide the desired roll control for the vehicle 10. As mentioned above, the desired position for each hydraulic actuator 24 is full compression. If, however, one of the pistons 34 is latched such that the associated hydraulic actuator 24 is not in full compression, the torsion bar 22, the pressurised gas in chamber 38, the spring 80, and any road irregularities, will exert a net force on that piston. The effect of the net force is to push hydraulic fluid from the associated compression chamber 30 into the associated rebound chamber 32 by way of the valve 36 (which is set to allow fluid flow into, but not out of, the rebound chamber). Such an arrangement allows the incorrectly latched piston 34 to gradually move to reduce the volume of the compression chamber 30, and hence bring the hydraulic actuator 24 towards a full compression position.

A preferred arrangement for each hydraulic actuator 24 is shown in FIG. 3. Each hydraulic actuator 24 comprises a tubular inner wall 52, and a tubular outer wall 54 substantially coaxial with the inner wall. The piston 34 makes a sealing sliding fit with the inner surface 56 of the inner wall 52. A piston rod guide 60 closes one end 62 of the inner wall 52. The rebound chamber 32 is positioned within the inner wall 52 between the piston 34 and the piston rod guide 60. The piston rod 58 is secured to the piston 34, extends through the rebound chamber 32, makes a sealing sliding fit with the piston rod guide 60, and is secured to one end 28 of the torsion bar 22. The other end 66 of the inner wall 52 is closed and secured to the suspension unit 18. A floating piston 70 makes a sealing sliding fit with the inner surface 56 of the inner wall 52 adjacent the closed end 66. The compression chamber 30 is positioned within the inner wall 52 between the piston 34 and the floating piston 70. The compressible gas chamber 38 is positioned between the floating piston 70 and the closed end 66 of the inner wall 52. The valve 36 is located in the piston 34. The leads 40 from the control unit 26 pass along an axially extending bore 72 formed in the piston rod 58. The rebound chamber 32 is fluidly connected with the valve 36 by way of a first bore 74 formed in the piston 34. The compression chamber 30 is fluidly connected with the valve 36 by way of a second bore 76 formed in the piston. An annular member 82 is attached to the piston rod 58 externally of the piston rod guide 60. One end 64 of the outer wall 54 is secured to the annular member 82. The other end 68 of the outer wall 54 is bent radially inwards towards the inner wall 52 to define a first shoulder 84. The piston rod guide 60 has an extension 86 which extends radially outwards towards the outer wall 54 to define a second shoulder 88. The spring 80 is a helical compressible spring which is positioned between the inner and outer walls 52,54 and extends between the first and second shoulders 84,88. During extension of the hydraulic actuator 24, the spring 80 is compressed as the first and second shoulders 84,88 move towards one another. The spring 80 therefore biases the hydraulic actuator 24 towards the full compression position. An annular stop member 90 is secured inside the inner wall 52 between the piston 34 and the floating piston 70. The stop member 90 is engaged by the piston 34 when the hydraulic actuator 24 reaches the full compression position and hence defines the predetermined full compression position. An annular elastomeric member 92 may be positioned between the stop member 90 and the piston 34.

Alternative arrangements for the above described arrangement for each hydraulic actuator 24 may be used. For example, the valve 36 may be located at any other suitable position rather than in the piston 34. Dependent on the location of the valve 36 in the piston 34, one or both of the bores 74,76 may be omitted. The mounting arrangement of the hydraulic actuator 24 may be reversed with the piston rod 58 attached to the suspension unit 18 and the inner wall 52 attached to the torsion bar 22. The compressible gas chamber 38 may be located at any other suitable positioned within the hydraulic actuator 24. The second shoulder 88 may be defined by an outward extension of the inner wall 52 rather than the outward extension 86 of the piston rod guide 60. The stop member 90 may be omitted, with the full compression position determined by the annular member 82 on the piston rod 58 engaging the piston rod guide 60. In this latter arrangement, the annular elastomeric member 92 may be positioned between the annular member 82 and the piston rod guide 60. The outer wall 54 and compressible spring 80 may be omitted and replaced by compressible spring means positioned inside the inner tube 52, and possibly associated with the stop member 90.

The present invention provides a roll control system 20 in which the hydraulic actuators 24 reduce problems associated with latching of the torsion bar 22 in the wrong position. Also, the hydraulic actuators 24 are self-contained hydraulic units and do not require external hydraulic connections, which allows easier installation of the roll control system 20 in the vehicle 10.

What is claimed is:

1. A roll control system for installation between axially aligned wheels of a motor vehicle, the roll control system comprising a torsion bar; a first hydraulic actuator attached to one end of the torsion bar and attachable to one of the wheels; a second hydraulic actuator attached to the other end of the torsion bar and attachable to the other wheel; and an electronic control unit monitoring one or more predetermined vehicle operating conditions; wherein the first and second hydraulic actuators are substantially identical, each comprising a compression chamber containing hydraulic fluid, a rebound chamber containing hydraulic fluid, a movable piston between and fluidly isolating the compression chamber and the rebound chamber, a piston rod connected to the piston and extending through the rebound chamber, a gas chamber containing pressurised gas acting on the hydraulic fluid in the compression chamber, a compressible spring means biasing the piston towards the compression chamber, and an electrically operated valve between the compression chamber and the rebound chamber and actuated by the control unit dependent on the monitored conditions, the valve being actuable between a two-way position in which the valve allows hydraulic fluid to flow between the compression chamber and the rebound chamber and a one-way position in which the valve allows hydraulic fluid to flow from the compression chamber into the rebound chamber but not from the rebound chamber into the compression chamber.

2. A roll control system as claimed in claim 1, wherein the valve of each hydraulic actuator is biased to the one-way position.

3. A roll control system as claimed in claim 1 or claim 2, wherein each hydraulic actuator has a tubular inner wall and a tubular outer wall coaxial with the inner wall, the piston making a sealing sliding fit with the inner surface of the inner wall to define the compression chamber and the rebound chamber within the inner wall, wherein one end of the inner wall is closed by a piston rod guide through which the piston rod extends in a sealing sliding fit, and wherein one end of the outer wall is attached to the piston rod.

4. A roll control system as claimed in claim 3, wherein the spring means is a compressible helical spring positioned between the inner wall and the outer wall and in engagement with a shoulder formed at the one end of the inner wall and a shoulder formed at the other end of the outer wall.

5. A roll control system as claimed in claim 3, wherein the gas chamber is positioned at the other end of the inner wall and is defined by a floating piston which makes a sealing sliding fit with the inner surface of the inner wall, the compression chamber being located between the piston and the floating piston.

6. A roll control system as claimed in claim 1 or claim 2, wherein each hydraulic actuator has a tubular wall, the piston making a sealing sliding fit with the inner surface of the wall to define the compression chamber and the rebound chamber within the wall, wherein one end of the wall is closed by a piston rod guide through which the piston rod extends in a sealing sliding fit, and wherein the compressible spring means is positioned inside the wall.

7. A roll control system as claimed in claim 1, wherein the valve of each hydraulic actuator is positioned in the piston of each hydraulic actuator.

8. A roll control system as claimed in claim 1, wherein the control unit is a microprocessor which is electrically connected to one or more sensors mounted in the motor vehicle for monitoring the one or more predetermined vehicle operating conditions.

9. A roll control system as claimed in claim 1, wherein the one end of the torsion bar is attached to the piston rod of the first hydraulic actuator, and the other end of the torsion bar is attached to the piston rod of the second hydraulic actuator.

10. A roll control system as claimed in claim 1, wherein a stop member is positioned in the compression chamber which is engageable by the piston.

11. A roll control system as claimed in claim 4, wherein the gas chamber is positioned at the other end of the inner wall and is defined by a floating piston which makes a sealing sliding fit with the inner surface of the inner wall, the compression chamber being located between the piston and the floating piston.

12. A roll control system as claimed in claim 2, wherein the valve of each hydraulic actuator is positioned in the piston of each hydraulic actuator.

13. A roll control system as claimed in claim 2, wherein the control unit is a microprocessor which is electrically connected to one or more sensors mounted in the motor vehicle for monitoring the one or more predetermined vehicle operating conditions.

14. A roll control system as claimed in claim 2, wherein the one end of the torsion bar is attached to the piston rod of the first hydraulic actuator, and the other end of the torsion bar is attached to the piston rod of the second hydraulic actuator.

15. A roll control system as claimed in claim 2, wherein a stop member is positioned in the compression chamber which is engageable by the piston.

16. A roll control system as claimed in claim 3, wherein the valve of each hydraulic actuator is positioned in the piston of each hydraulic actuator.

17. A roll control system as claimed in claim 3, wherein the control unit is a microprocessor which is electrically connected to one or more sensors mounted in the motor vehicle for monitoring the one or more predetermined vehicle operating conditions.

18. A roll control system as claimed in claim 3, wherein the one end of the torsion bar is attached to the piston rod of the first hydraulic actuator, and the other end of the torsion bar is attached to the piston rod of the second hydraulic actuator.

19. A roll control system as claimed in claim 3, wherein a stop member is positioned in the compression chamber which is engageable by the piston.

* * * * *